Patented May 13, 1941

2,241,520

UNITED STATES PATENT OFFICE 2,241,520

VITREOUS ENAMEL

Victor Hawthorne Remington and Ray Andrews, Washington, Pa., assignors to B. F. Drakenfeld & Co. Inc., New York, N. Y., a corporation of New York No Drawing. Application June 11, 1936, Serial No. 84,772

1 Claim. (Cl. 106—36.2)

This invention relates to that class of vitreous enamels, generally colored or opaque which are applied to preformed articles of glass and affixed thereto by subsequent firing to a temperature which will melt the enamel and cause it to adhere to the surface of the articles. This, to prevent deformation of the article during firing, requires that the enamel have a relatively low melting point and this has only been obtained in the past by the use of certain batch ingredients in such proportions that the resultant glass is not stable against the usual vegetable acids or against the alkalies.

The object of this invention is to provide a vitreous enamel having a sufficiently low melting point and possessing a relatively high stability against chemical attack.

We have discovered that a vitrifiable enamel frit, having a molecular composition of one molecule of lead oxide and two molecules of silica ($PbO \cdot 2SiO_2$) has excellent chemical resistance which is only slightly modified by the addition of certain acid and alkali forming ingredients necessary to lower its fusing point. Such enamels can be obtained by preparing a frit having a composition within the following limits.

| | Per cent |
|---|---|
| Lead oxide | 60–65 |
| Boric oxide | 0– 4 |
| Sodium oxide | 0– 2 |
| Silica | 30–35 |

As specific examples we give the following batch formulae:

| | A | B |
|---|---|---|
| PbO | 62.58 | 63.46 |
| $SiO_2$ | 32.73 | 31.00 |
| $B_2O_3$ | 3.24 | 3.84 |
| $Na_2O$ | 1.44 | 1.71 |
| Melting point | 1100° F. | 1080° F. |

To these enamel frits some inorganic coloring compound is added in the case of colored or white opaquing compound in case of white enamels in order to give a definite shade or definite opacity, and the whole ground to 325 mesh or finer. The resultant product may be applied in any known way to the glass article and fired thereon. A common method of such application is to mix the ground colored frit with a suitable vehicle and apply it by a stencil or stamp to the article to be decorated or treated.

Having thus described our invention what we claim is:

A vitreous enamel containing approximately 63% lead oxide; 31 to 33% silica; between 3 and 4% boric oxide; and approximately 1½% sodium oxide.

VICTOR HAWTHORNE REMINGTON.
RAY ANDREWS.